Patented Oct. 10, 1922.

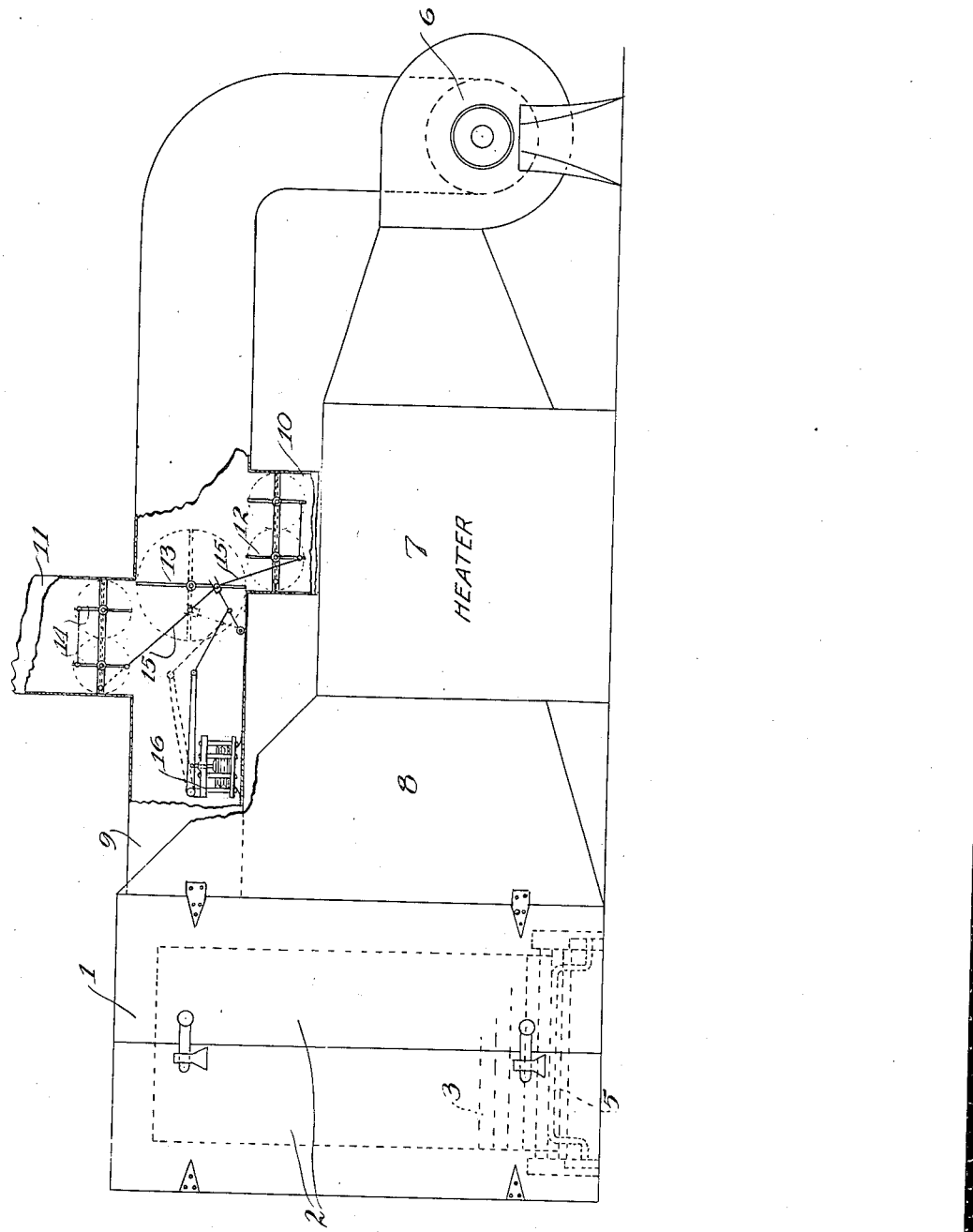

1,431,145

UNITED STATES PATENT OFFICE.

JOHN E. BOLLING, OF CHICAGO, ILLINOIS, ASSIGNOR TO DRYING SYSTEMS, INC., OF CHICAGO, ILLINOIS, A CORPORATION OF ILLINOIS.

DRYING APPARATUS.

Application filed April 20, 1918. Serial No. 229,700.

*To all whom it may concern:*

Be it known that I, JOHN E. BOLLING, a citizen of the United States of America, and a resident of Chicago, county of Cook, and State of Illinois, have invented certain new and useful Improvements in Drying Apparatus, of which the following is a specification.

This invention relates generally to air conditioning apparatus and particularly to drying apparatus wherein moisture or volatile constituents of the articles being dried are removed by a current of heated air.

The main object of this invention is to provide improved means for regulating the humidity and temperature of the air which is employed as the drying medium. The specific object of the invention is to control the humidity of the air supplied to the drying compartment, by apparatus which is actuated by a change in temperature of the air due to the effect of the evaporation of moisture or other volatile constituents of the product being dried.

The drawing is a diagrammatic side elevation of a drying apparatus embodying a specific form of this invention.

The specific purpose for which the herein-described apparatus is particularly designed is the drying of fruits and vegetables according to known processes, in order to render them less perishable and to reduce their bulk, but it is apparent that the invention is applicable to many other uses.

The device shown provides means for automatically controlling the rate of dehydration by regulating the extent to which the air is recirculated and the supply of fresh air admitted to the apparatus, according to the fall in temperature of the air in the drying compartment due to evaporation of moisture from the product being dried.

Referring to the drawing, a drying compartment 1 is shown having doors 2. The product to be dehydrated is supported on removable trays 3 suitably supported or stacked on a truck 5 to provide air passages between the trays. Air is caused to enter the drying compartment by a power driven blower 6. The outlet side of the blower communicates with an air heating compartment 7 which in turn communicates with the drying compartment 1 through the duct 8. A return conduit 9 provides communication between the drying compartment 1 and the blower 6. The conduit 9 is formed to provide an air intake 10 and an air outlet 11. The intake, outlet, and the conduit 9 are respectively controlled by a plurality of dampers 12, 13, and 14. These dampers are connected together by a link construction 15 or by other operating means which serve to maintain the dampers in proper relative angular position. In the arrangement shown, the dampers always remain parallel.

The thermostatic diaphragm motor 16 or other thermostaticaly controlled device is connected to the dampers in such manner that a change in temperature within the drying room 1 or conduit 9 results in a corresponding motion of all the dampers.

In the operation of the apparatus shown, the supply of air is maintained at a constant or drying temperature by the heater 7. The air may be delivered to the drying room at any desired temperature, but for any particular product, the air should vary in temperature only a minimum amount in order that the water which such air will vaporize when passing through the drying chamber may be exactly predetermined.

The fall in temperature of the air, due to the evaporation of water or other volatile constituents from the product being treated, is accordingly a measure of the amount of moisture evaporated from the product. The thermostatic device, being subject in its action to the fall of temperature, controls, the dampers 12, 13, and 14 to regulate the respective quantities of air passing through the outlet 11 and recirculated or entering the intake 10.

Although but one specific embodiment of this invention has been herein shown and described, it will be understood that numerous details of the construction shown may be altered or omitted without departing from the spirit of this invention as defined by the following claims.

I claim:

1. In an apparatus of the class described, the combination with a drying compartment, of means for supplying air to said compartment at a constant temperature, and thermostatically controlled means for releasing air from said compartment in accordance with the fall in temperature in said compartment.

2. In an apparatus of the class described, the combination with a drying compartment, of means for supplying air to said compartment at a constant temperature, means for causing the recirculation of the air through said compartment, said last-mentioned means being under the control of a thermostatic device arranged to respond to temperature changes in said drying compartment.

3. In an apparatus of the class described, the combination with a drying compartment, of means for supplying air to said compartment at a constant temperature, and means for causing the recirculation of the air through said compartment, said last mentioned means being arranged to be limited in its effectiveness according to the fall in temperature of the air in said compartment.

4. The combination of a drying compartment having an air inlet, an outlet, a recirculation duct and means controlled thermostatically for regulating the relative flow of air through said inlet, outlet and duct, said thermostatically controlled means being arranged in said duct and located between said drying compartment and outlet so as to be sensitive to the air leaving said compartment.

5. The combination of a drying compartment, having an inlet, an outlet, a recirculation duct, means for causing air to flow through said compartment, and a system of interconnected dampers respectively controlling said inlet, outlet and duct, and thermostatic means controlled by the temperature of the air leaving the articles being dried for actuating said dampers.

Signed at Chicago this 16th day of April, 1918.

JOHN E. BOLLING.